United States Patent [19]

Mikkor

[11] Patent Number: 4,701,826
[45] Date of Patent: Oct. 20, 1987

[54] HIGH TEMPERATURE PRESSURE SENSOR WITH LOW PARASITIC CAPACITANCE

[75] Inventor: Mati Mikkor, Ann Arbor, Mich.

[73] Assignee: Ford Motor Company, Dearborn, Mich.

[21] Appl. No.: 924,721

[22] Filed: Oct. 30, 1986

[51] Int. Cl.⁴ ............................................. H01G 7/00
[52] U.S. Cl. ................................................. 361/283
[58] Field of Search ................. 29/25.41; 73/718, 724; 361/283

[56] References Cited

U.S. PATENT DOCUMENTS

| | | | |
|---|---|---|---|
| 4,177,496 | 12/1979 | Bell et al. | 361/283 |
| 4,184,189 | 1/1980 | Davis et al. | 361/283 |
| 4,207,604 | 6/1980 | Bell | 361/283 |
| 4,261,086 | 4/1981 | Giachino et al. | 29/25.41 |
| 4,345,299 | 8/1982 | Ho | 361/283 |
| 4,386,453 | 6/1983 | Giachino et al. | 29/25.41 |
| 4,390,925 | 6/1983 | Freud | 361/283 |
| 4,415,948 | 11/1983 | Grantham et al. | 361/283 |
| 4,420,790 | 12/1983 | Golke et al. | 361/283 |
| 4,424,713 | 1/1984 | Kroninger, Jr. et al. | 73/718 |
| 4,586,109 | 4/1986 | Peters et al. | 29/25.41 X |
| 4,609,966 | 9/1986 | Kuisma | 73/724 X |

*Primary Examiner*—Donald A. Griffin
*Attorney, Agent, or Firm*—Peter Abolins; Keith L. Zerschling

[57] ABSTRACT

A silicon variable capacitance pressure sensor has two silicon wafers. The first wafer has a first capacitor plate contacting a highly doped first semiconductor path through the first wafer. The second wafer has a second capacitor plate contacting a highly doped second semiconductor path through the second wafer. An insulating layer is attached to the first and second wafers for preventing electrically conductive coupling between the first and second wafers, thereby reducing parasitic capacitance between the first and second semiconductor paths.

1 Claim, 3 Drawing Figures

HIGH TEMPERATURE PRESSURE SENSOR WITH LOW PARASITIC CAPACITANCE

BACKGROUND OF THE INVENTION

1. Field of the Invention

This invention relates to a structure for variable capacitance pressure transducers using semiconductor materials.

2. Prior Art

U.S. Pat. No. 4,415,948 teaches bonding of two highly doped silicon wafers, one with an etched cavity, together by using an intermediary glass coating deposited on one wafer. The other wafer is sealed to the coated Wafer by electrostatic bonding. In this device, the silicon itself acts as an electrical conductor and no feedthroughs are used. This patent neither teaches nor suggests the special fabrication features which can be advantageously used when lightly doped silicon wafers are used and when contact to metalized electrodes on the inner surfaces of an enclosed cavity between the silicon wafers is made by a highly conductive path in the lightly doped silicon.

U.S. Pat. No. 4,420,790 teaches forming a cavity by putting silicon spacers between two silicon plates that are covered with passivation layers of silicon dioxide and by a combination of silicon dioxide and silicon nitride layers. These layers electrically isolate the capacitor electrodes. The sensor cavity is not hermetically sealed but is open to the ambient. The two silicon plates are joined together by solder bumps and the spacing between the plates is kept constant by the spacers.

U.S. Pat. No. 4,424,713 teaches making a sensor structure including plates of glass, silicon and glass. The silicon is sealed to the glass by electrostatic bonding. The silicon plate has cavities on both sides, the cavity on one side being bigger than on the other side in order to provide stress relief on the silicon diaphragm. The teachings of this patent include relieving stresses at the glass silicon interface where the silicon diaphragm of a pressure sensor is bonded to glass plate by anodic bonding on both its front and back surfaces. Contact to electrodes on plate glass is made by metalized holes in the glass plate.

U.S. Pat. No. 4,390,925 teaches making a sensor with multiple interconnected cavities in a silicon plate bonded electrostatically to a glass plate. Such a structure is taught to be a high pressure sensor.

U.S. Pat. No. 4,184,189 teaches making a sensor with two metalized glass plates bonded together by a sealing glass mixture at about 500° C. The spacing between plates is achieved by shim stock, such as a glass sealing spacer ring.

U.S. Pat. No. 4,207,604 teaches making a pressure sensor with a pair of insulating metalized plates sealed by melting glass frit. A metalized guard ring for the capacitor is used.

U.S. Pat. No. 4,345,299 teaches using two metalized ceramic substrates with an annular sealing ring to form a capacitive pressure transducer.

U.S. Pat. No. 4,177,496 teaches metalizing a pair of thin insulating plates (alumina quartz, pyrex) to form a capacitor. Glass frit or ceramic base material is fired to form a seal.

U.S. Pat. No. 4,261,086 teaches making a sensor by using a silicon wafer with etched cavities and anodically bonding it to a relatively thick glass substrate, for example, 1 mm to 2 mm. The capacitor electrodes are formed by metalizing the glass and highly doping the silicon cavity surface. Electrical connections are made through metalized holes in the glass.

U.S. Pat. No. 4,386,453 teaches making a sensor by using a silicon wafer with etched cavities anodically bonded to a glass substrate. There is metallization of holes drilled in the glass. The metalized holes are used as electrical feedthroughs to make contact to capacitor plates.

Even though there are known capacitive-type pressure sensors, there continues to be a need to have a pressure sensor which has reduced parasitic capacitance, improved reliability in maintaining the hermetic seal of the sensing cavity and is not adversely effected by thermocycling. These are some of the problems this invention overcomes.

SUMMARY OF THE INVENTION

A pressure sensor in accordance with an embodiment of this invention has low parasitic capacitance by using the combination of two silicon wafers, each having highly doped p+ paths in a lightly doped n-type silicon wafer to make contact to the capacitor electrodes, and by electrically isolating the silicon wafers from each other by an intervening insulating layer like pyrex glass or silicon dioxide. The electrical isolation between the silicon wafer containing the diaphragm of the capacitor pressure sensor and the silicon substrate is important to reduce the parasitic capacitance between the electrical feedthroughs which make contact to the electrodes. Otherwise, the parasitic capacitance due to the depletion layer capacitances between the n and P+ regions associated with the feedthroughs and with the doped electrode can be large compared to the caPacitance of the parallel plate capacitor.

DETAILED DESCRIPTION OF THE INVENTION

Figure 1:
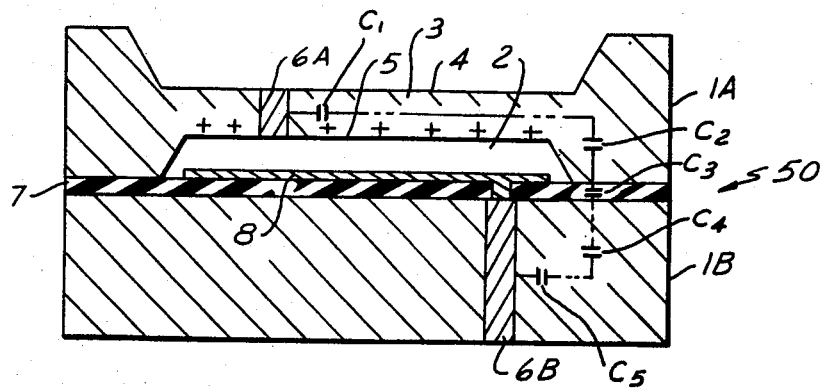
FIG. 1 is a cross section in accordance with a first embodiment of this invention using one semiconductor and one metallization capacitor plate.

Referring to FIG. 1, a pressure sensor 50 includes an upper silicon wafer 1A having a cavity 2 etched therein. A lower n-type silicon wafer 1B acts as a substrate for upper n-type silicon wafer 1A. A diaphragm 3 is the region of silicon wafer 1A adjacent cavity 2 and is relatively thin to permit deflection. A surface 4 is the exposed surface of wafer 1A opposite cavity 2. A highly boron doped p+ surface 5 of diaphragm 3 faces a cavity 2 and acts as a capacitor electrode.

Electrical feedthroughs 6A and 6B extend through silicon wafer 1A and silicon wafer 1B, respectively. Electrical feedthroughs 6A and 6B are highly doped p+ paths in an n-type silicon making contact to capacitor electrodes 5 and 8, respectively. An insulating dielectric layer 7 is formed of pyrex or silicon dioxide. Layer 7 is positioned between silicon wafers 1A and 1B where they are anodically bonded to each other via layer 7 which extends into the region of cavity 2. Metal caPacitor electrode 8 is formed on the portion of insulating dielectric layer 7 which is adjacent to cavity 2.

In operation, capacitor electrodes 5 and 8 form a parallel plate capacitor. Pressure exerted on diaphragm 3 of cavity 2 deflects diaphragm 3 and changes the capacitance. This change in capacitance due to pressure is measured by electronic circuit. Pressure sensor 50 can operate at high temperatures, up to about 1000° C. for version using $SiO_2$ dielectric layer 7, and has low parasitic capacitance. This is achieved by using the combination of highly doped p+ paths in lightly doped n-type silicon wafers to make contact to the capacitor electrodes and by electrically isolating the silicon wafers from each other by intervening insulting layer 7. The electrical isolation between silicon wafer 1A containing diaphragm 3 and silicon substrate 1B is important in order to reduce the parasitic capacitance between the electrical feedthroughs 6A and 6B which make contact to electrodes 5 and 8. Otherwise, the depletion layer capacitances between the n and p+ regions associated with the feedthroughs 6A and 6B, and with doped p+ electrode 5, can be large compared to the capacitance of the parallel plate capacitor.

The depletion layer capacitance contributes to the parasitic capacitance Cp between the feedthroughs but is minimized by the intervening dielectric layer 7 between the silicon wafers. The capacitance of the device is $$C = Co + Cp$$

where Co is the capacitance of the parallel plate capacitor that varies with pressure and Cp is the parasitic caPacitance in parallel with Co consisting of the following components:

$$1/Cp = 1/C_1 + 1/C_2 + 1/C_3 + 1/C_4 + 1/C_5$$

where
- $C_1$ is the depletion layer capacitance between p+ regions of feedthrough 6A and P+electrode 5, and the n-doped wafer 1A.
- $C_2$ and $C_4$ are interface capacitances between the insulating layer 7 and silicon wafers 1A and 1B.
- $C_3$ is the capacitance between silicon wafers 1A and 1B across dielectric layer 7. This is small and is the main term contributing to $C_p$.
- $C_5$ is the depletion layer capacitance between p+ feedthrough 6B and wafer 1B, and also includes the capacitance between metal electrode 8 and wafer 1B. The latter is small because of the intervening dielectric layer 7.

Advantageousy, when fabricating pressure sensor 50, pyrex glass and silicon dioxide are used for dielectric layer 7 because these materials can be anodically bonded to silicon to make a hermetic seal. Pyrex, in addition, has a thermal coefficient of expansion closely matching that of silicon.

For example, the following processing steps can be used when processing wafer 1A and using pyrex glass as a dielectric layer 7 between silicon wafers 1A and 1B.

1. The lightly doped n-type silicon wafers 1A and 1B are ground and polished to thickness.

2. A silicon dioxide or a silicon nitride film is grown or deposited on both sides of wafer 1A using techniques common in integrated circuit fabrication. These films are inert to silicon etches.

3. Photolithography techniques are used to pattern the wafer and remove the oxide or nitride films at surface 4 adjacent the diaphragm area. Then an anisotropic etch, like KOH and $H_2O$, is used to etch the silicon until proper thickness of diaphragm 3 is achieved.

4. Wafer IA is patterned on the side opposite surface 4 using photolithography techniques, oxide removed at the cavity area, and a shallow cavity 2 to 10 $\mu$m in depth is etched into silicon wafer 1A. Etching of diaphragm on the opposite side of wafer also continues. This additional etching is taken into account in step 3 on when to stop the diaphragm etching.

5. Next, aluminum dots 10 to 100 m in diameter and 2 to 5 $\mu$m thick are evaporated onto diaphragm 3 at the location of feedthroughs 6A and 6B. Wafer 1A is put into a furnace where a thermal gradient is applied perpendicular to the wafer surface. The atmosphere in the furnace is a vacuum or an inert gas like argon. Wafer 1A is placed so that the aluminum dots are on the low temperature side of wafer 1A. Wafer 1A is heated to 1000° C. or higher in a temperature gradient of 100° to 200° C./cm. The aluminum melts forming a liquid eutectic drop of aluminum silicon (m.p. 677° C.) that migrates in the direction of the thermal gradient, leaving behind a highly aluminum doped p+ path. This path is used to make contacts to the electrode 5.

6. Electrode 5 inside the cavity 2 is formed by highly doping the cavity surface with a p-type dopant like boron. Alternately, a metal film electrode can be deposited by vacuum evaporation or by sputtering.

Processing continues with the following steps in connection with wafer 1B:

7. An aluminum doped p+ path on substrate wafer 1B is formed in same manner as outlined in step 5. This path is used to make contact to electrode 8.

8. A pyrex glass film 7, about 4 $\mu$m thick is deposited on wafer 1B for example by sputtering. Using photolithographic techniques, a hole is etched into the pyrex film at feedthrough location 6B and then a metal electrode, for example, 1000 A of chromium, 3000 A of gold is deposited on the pyrex layer to form electrode 8. Again the electrode can be defined using photolithographic techniques or by evaporation of metals through a shadow mask.

9. The bonding of wafers 1A and 1B is accomplished by aligning the electrodes 5 and 8, holding the wafers together, heating them to about 400° C. in vacuum (for an absolute pressure sensor) and applying a negative potential of 400-500 volts across the pyrex film (i.e. to wafer IB; the applied potential is lower than the electric field required for dielectric breakdown) and a positive potential to silicon wafer 1A. This will form an anodic bond between the silicon 1A and the pyrex 7 that is hermetic.

10. External metal contact pads are put on at feedthrough locations 6A and 6B by usual metalization techniques.

Figure 2:
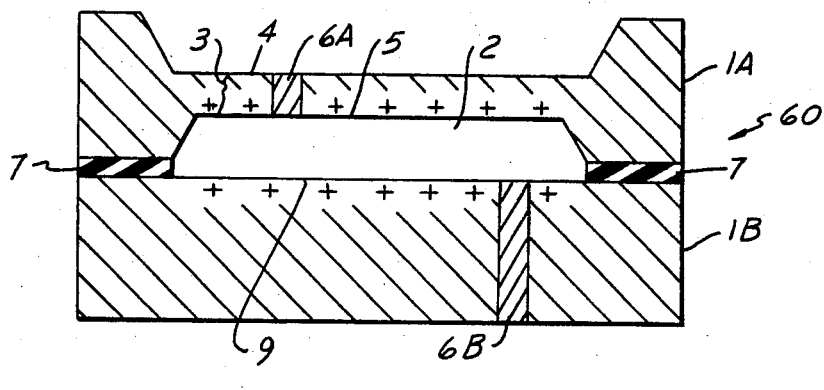
FIG. 2 is a cross section in accordance with a second embodiment of this invention using two semiconductor capacitor plates.

For high temperature applications it is particularly desirable to form dielectric layer 7 of silicon diode. At temperatures greater than 600° C., silicon becomes electrically conductive, the intrinsic carrier concentration becomes comparable to extrinsic carrier concentration. Thus, if capacitive type silicon pressure sensors are to be used at these temperatures, the silicon wafers, i.e. 1A and 1B, have to be isolated from each other by high temperature insulating layer-like silicon dioxide ($SiO_2$) in order to prevent the shorting of capacitor electrodes. An appropriate sensor 60 is shown in FIG. 2. Similar features have the same numbers as in FIG. 1. Dielectric layer 7 is silicon dioxide (SiO₂) and both capacitor electrodes 5 and 9 are highly doped p+ surfaces on lightly doped n-type silicon wafers 1A and 1B.

Silicon dioxide insulating layer 7 is used because the oxide layer grown on one wafer (e.g. wafer 1B) can be bonded to silicon (e.g. wafer 1A) by anodic bonding at temperatures 800° C. to form a hermetic seal. In addition, silicon dioxide is a high temperature material and can be used at temperatures well in excess of 1000° C. Both capacitor electrodes are highly doped p+ surfaces (e.g. boron doped). This eliminates adhesion problems due to thermal cycling (mismatch of thermal coefficients of expansion) of possible other conducting films that could be used for electrodes.

Sensor 60 configuration shown in FIG. 2 can also be used where the dielectric layer 7 is a pyrex glass film. This can be useful at temperatures below 600° C., since pyrex glass (Corning 7740) matches the thermal coefficient of expansion of silicon better than silicon dioxide. This helps to reduce thermal strains and stresses in the sensor.

Figure 3:
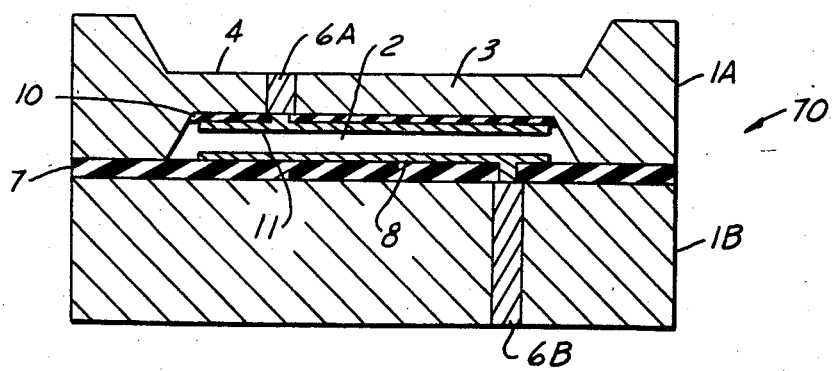
FIG. 3 is a cross section of a pressure sensor in accordance with a third embodiment of this invention using two metallization capacitor plates.

Referring to FIG. 3, a sensor 70 has similar features identified with the same number designations as in FIGS. 1 and 2. The structure is similar to structure 50 of FIG. 1 except that the highly doped surface capacitor electrode 5 of sensor 50 is replaced by a dielectric layer 10, such as silicon dioxide or some other deposited, insulating layer formed on the interior surface of diaphragm 3 facing cavity 2. On the cavity side of layer 10 a metal electrode 11 is formed. As a result, both electrodes 9 and 10 are isolated from silicon wafers 1A and 1B by insulating layer 7 as illustrated in FIG. 3.

Various modifications and variations will no doubt occur to those skilled in the art to which this invention pertains. For example, the particular shape of the cavity may be varied from that disclosed herein. These and all other variations which basically rely on the teachings through which disclosure has advanced the art are properly considered within the scope of this invention as defined by the appended claims.

I claim:

1. A silicon variable capacitance pressure sensor including:
   a first lightly doped n (or p)-type silicon wafer having a first cavity with a first p+ (or n+) doped capacitor plate with a highly doped first p+ (or n+) semiconductor path through said first wafer contacting said first capacitance plate;
   a second lightly doped n (or p)-type silicon wafer having a second p+ doped (or r+) capacitor plate with a highly doped second p+ (or n+) semiconductor path through said second wafer contacting said second capacitor plate;
   an insulating layer attached to said first and second silicon wafers at a region outside the extent of said first cavity preventing electrically conductive coupling between said first and second wafers, thereby reducing parasitic capacitance between the first and semiconductor paths;
   said first and second capacitor plates being highly doped semiconductor regions positioned adjacent each other and separated from each other by the depth of said cavity;
   said insulating layer being formed of silicon dioxide thereby producing a structure suitable for operation at relatively high temperature; and
   said first and second silicon wafers being adapted for having formed therein an integrated circuit.

* * * * *